US010901506B2

United States Patent
Wu et al.

(10) Patent No.: US 10,901,506 B2
(45) Date of Patent: Jan. 26, 2021

(54) FINGER-GESTURE DETECTION DEVICE FOR CONTROL HANDLE USE IN VIRTUAL REALITY, CONTROL ASSEMBLY HAVING THE SAME AND CORRECTION METHOD FOR VIRTUAL REALITY SYSTEM

(71) Applicant: HTC Corporation, Taoyuan (TW)

(72) Inventors: Chien-Min Wu, Taoyuan (TW); Huan-Hsin Li, Taoyuan (TW); Li-Hsun Chang, Taoyuan (TW); Tian-Jia Hsieh, Taoyuan (TW); Tzu-Hao Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/525,599

(22) Filed: Jul. 30, 2019

(65) Prior Publication Data

US 2020/0050268 A1    Feb. 13, 2020

Related U.S. Application Data

(60) Provisional application No. 62/712,183, filed on Jul. 30, 2018, provisional application No. 62/774,883, filed on Dec. 4, 2018.

(51) Int. Cl.
*G06F 3/01* (2006.01)
*G06F 3/0346* (2013.01)
(Continued)

(52) U.S. Cl.
CPC .............. *G06F 3/014* (2013.01); *G06F 3/017* (2013.01); *G06F 3/0346* (2013.01);
(Continued)

(58) Field of Classification Search
None
See application file for complete search history.

(56) References Cited

U.S. PATENT DOCUMENTS 9,870,052 B2    1/2018  Higgins et al.
9,898,091 B2    2/2018  Bristol et al.
(Continued)

FOREIGN PATENT DOCUMENTS

CN    106843482    6/2017
JP    5750717      7/2015
(Continued)

OTHER PUBLICATIONS

"Office Action of Taiwan Counterpart Application", dated Aug. 11, 2020, p. 1-p. 3.

*Primary Examiner* — David D Davis
(74) *Attorney, Agent, or Firm* — JCIPRNET

(57) ABSTRACT

A finger-gesture detection device adapted for a control handle includes a grip portion. The finger-gesture detection device includes a first wearing portion, a plurality of second wearing portions, and a plurality of first sensors. The first wearing portion is adapted to detachably surround the grip portion of the control handle. When the grip portion connects the first wearing portion, the grip portion is positioned on one side of the first wearing portion. The second wearing portions are each independently connected to the first wearing portion. When a force is applied to one of the second wearing portions, the corresponding second wearing portion moves toward the grip portion. The first sensors are respectively disposed on the second wearing portions for detecting positions or movements of the second wearing portions relative to the grip portion. A control assembly and a correction method are also proposed.

16 Claims, 7 Drawing Sheets

(51) Int. Cl.
*G02B 27/01* (2006.01)
*G06F 3/0481* (2013.01)

(52) U.S. Cl.
CPC ........ *G02B 27/017* (2013.01); *G06F 3/04815* (2013.01); *G06F 2203/0331* (2013.01)

(56) References Cited

U.S. PATENT DOCUMENTS

| | | |
|---|---|---|
| 9,921,642 B2 | 3/2018 | Webb et al. |
| 9,999,833 B2 | 6/2018 | Higgins et al. |
| 10,183,217 B2 | 1/2019 | Chen et al. |
| 2012/0157263 A1 | 6/2012 | Sivak et al. |
| 2016/0162022 A1* | 6/2016 | Seth ................ G06F 3/017 345/156 |
| 2017/0308165 A1* | 10/2017 | Erivantcev ............ G06F 3/038 |
| 2018/0101247 A1* | 4/2018 | Lee .................. G06F 3/03547 |
| 2018/0188816 A1* | 7/2018 | Liu .................... G06F 3/011 |

FOREIGN PATENT DOCUMENTS

| | | |
|---|---|---|
| KR | 20070090730 | 9/2007 |
| TW | 201814447 | 4/2018 |
| TW | 201826168 | 7/2018 |

* cited by examiner

FINGER-GESTURE DETECTION DEVICE FOR CONTROL HANDLE USE IN VIRTUAL REALITY, CONTROL ASSEMBLY HAVING THE SAME AND CORRECTION METHOD FOR VIRTUAL REALITY SYSTEM

CROSS-REFERENCE TO RELATED APPLICATION

This application claims the priority benefits of U.S. provisional application Ser. No. 62/712,183, filed on Jul. 30, 2018, and U.S. provisional application Ser. No. 62/774,883, filed on Dec. 4, 2018. The entirety of each of the above-mentioned patent applications is hereby incorporated by reference herein and made a part of this specification.

BACKGROUND OF THE INVENTION

1. Field of the Invention

The present disclosure relates to a finger-gesture detection device and method, and particularly, to a finger-gesture detection device suitable for use in virtual reality (VR), a control assembly, and a correction method.

2. Description of Related Art

VR technology is becoming more and more popular. Control handles are common input devices thereof. However, a conventional control handle can only provide a simple input function such as object clicking or object selection without detecting a bending degree of a finger, so the control handle cannot be applied to a virtual environment to which a finger gesture needs to be applied, such as piano playing or keyboard tapping.

SUMMARY OF THE INVENTION

The present disclosure provides a finger-gesture detection device, which can detect a finger state of a user.

The finger-gesture detection device of the present disclosure is suitable for a control handle. The control handle includes a grip portion, adapted to be gripped by a hand and moved in a three-dimensional space. The finger-gesture detection device includes a first wearing portion, a plurality of second wearing portions, and a plurality of first sensors. The first wearing portion is adapted to detachably surround the grip portion of the control handle. When the grip portion connects the first wearing portion, the grip portion is positioned on one side of the first wearing portion. The second wearing portions are each independently connected to the first wearing portion. When a force is applied to one of the second wearing portions, the corresponding second wearing portion moves toward the grip portion. The first sensors are respectively disposed on the second wearing portions for detecting the position or movement of the second wearing portions relative to the grip portion.

In an embodiment of the present disclosure, the plurality of second wearing portions is respectively worn on a plurality of fingers of the hand. Each of the fingers includes a first knuckle, a second knuckle, and a third knuckle, sequentially away from a fingertip. The second wearing portions are worn on the third knuckles.

In an embodiment of the present disclosure, the control handle includes a plurality of sensing components. The sensing components are disposed on the grip portion, and the sensing components and the first sensors sense each other to generate a signal.

In an embodiment of the present disclosure, the sensing components include magnets, and the sensing components alternately face the first sensors with S magnetic poles or N magnetic poles, respectively.

In an embodiment of the present disclosure, the finger-gesture detection device further includes a second sensing component. The second sensing component extends toward the first sensors and is disposed on the first wearing portion to sense with the first sensors to generate a signal. The second wearing portions are disposed between the second sensing component and the grip portion.

In an embodiment of the present disclosure, the finger-gesture detection device further includes a control module and a second sensor. The control module is disposed on the first wearing portion. The position of each of the first sensors relative to the grip portion is calculated by matching signals sensed by the first sensors with signals sensed by the second sensor.

In an embodiment of the present disclosure, when the first sensor detects the second sensing component, a signal detected by the first sensor is corrected.

In an embodiment of the present disclosure, the first sensor includes an inertial measurement unit (IMU) and a component sensing unit. When the component sensing unit detects the second sensing component, signals corresponding to corresponding positions of the second wearing portions and the grip portion, detected by the IMU, are corrected.

The finger-gesture detection device of the present disclosure is suitable for a control handle. The control handle includes a grip portion, adapted to be gripped by a hand and moved in a three-dimensional space. The grip portion is provided with a plurality of sensors. The finger-gesture detection device includes a first wearing portion, a plurality of second wearing portions, and a plurality of sensing components. The first wearing portion is adapted to detachably surround the grip portion of the control handle. When the grip portion connects the first wearing portion, the grip portion is positioned on one side of the first wearing portion. The second wearing portions are each independently connected to the first wearing portion. When a force is applied to one of the second wearing portions, the corresponding second wearing portion moves toward the grip portion. The sensing components are respectively disposed on the second wearing portions. Sensors corresponding to the sensing components are provided to detect the position or movement of the second wearing portions relative to the grip portion.

In an embodiment of the present disclosure, the second wearing portions are respectively worn on a plurality of fingers of the hand. Each of the fingers includes a first knuckle, a second knuckle, and a third knuckle, sequentially away from a fingertip. The second wearing portions are worn on the third knuckles.

In an embodiment of the present disclosure, the sensing components include magnets. The sensing components alternately face the grip portion with S magnetic poles or N magnetic poles, respectively.

A control assembly of the present disclosure is applied to VR, and includes a control handle and the aforementioned finger-gesture detection device.

In an embodiment of the present disclosure, the control handle includes a sensing component. The sensing component is disposed on a grip portion.

A correction method of the present disclosure is suitable for a VR system. The VR system maps a real hand gesture of a user to a virtual hand gesture. The virtual hand gesture includes a plurality of virtual finger gestures and a virtual palm gesture. The VR system includes a control handle for being gripped by a hand of the user, a finger-gesture detection device detachably surrounding the control handle and worn on the hand, and a computer. The finger-gesture detection device includes a plurality of first sensors and a second accessory sensor. The first sensors are respectively located on a plurality of fingers of the hand. The second accessory sensor is located on a palm of the hand. The first sensors include an IMU and a component sensing unit. The second accessory sensor includes an IMU and a component sensing unit. The correction method includes the following steps. The computer multiplies a real-time detection result of each of the first sensors by a first rotation matrix and a second rotation matrix to calculate each of the virtual finger gestures. The first rotation matrix is a transformation matrix between a coordinate system of each of the first sensors and a coordinate system of the second sensor. The second rotation matrix is a transformation matrix between the coordinate system of the second sensor and a coordinate system of the control handle. The computer directly uses the real-time detection result of the control handle as the virtual palm gesture.

In an embodiment of the present disclosure, the correction method further includes: when a difference between a real-time reading of an accelerometer of each of the first sensors and a real-time reading of an accelerometer of the second sensor is smaller than a preset value and a difference between real-time readings of the component sensing units of the adjacent first sensors is smaller than another preset value, correcting, by the computer, the virtual finger gesture of the virtual hand gesture to make the fingers straightened and closed with respect to the palm.

A correction method of the present disclosure is suitable for a VR system. The VR system includes a control handle for being gripped by a hand of a user, a finger-gesture detection device detachably connecting the control handle and worn on the hand, and a computer. The correction method includes the following steps. The computer calculates an actual bending range of a finger of the hand of the user relative to a palm of the hand according to an initial detection result of the finger-gesture detection device. The actual bending range has an upper bound and a lower bound. The computer maps a virtual bending range of a virtual finger corresponding to the finger according to the actual bending range. When a bending degree of the finger calculated according to a real-time detection result of the finger-gesture detection device exceeds the upper bound of the actual bending range, the upper bound of the actual bending range is updated with an excessive bending degree. When a bending degree of the finger calculated according to a real-time detection result of the finger-gesture detection device exceeds the lower bound of the actual bending range, the lower bound of the actual bending range is updated with an excessive bending degree.

Based on the above, the finger-gesture detection device of the present disclosure can detect the gesture of a corresponding finger by the first sensor disposed on the second wearing portion, thereby performing a more complicated input function in VR. The correction method of the present disclosure can correct a virtual hand gesture in real time according to a real hand gesture of a user through the computer by means of transformation between the first sensor, the second accessory sensor and the control handle. Besides, the computer can update upper and lower bounds of an actual bending range of the finger according to a real-time detection result of the finger-gesture detection device, thus estimating and correcting the virtual hand gesture according to a new bending range.

In order to make the aforementioned and other objectives and advantages of the present invention comprehensible, embodiments accompanied with figures are described in detail below.

DESCRIPTION OF THE EMBODIMENTS

Figure 1A:
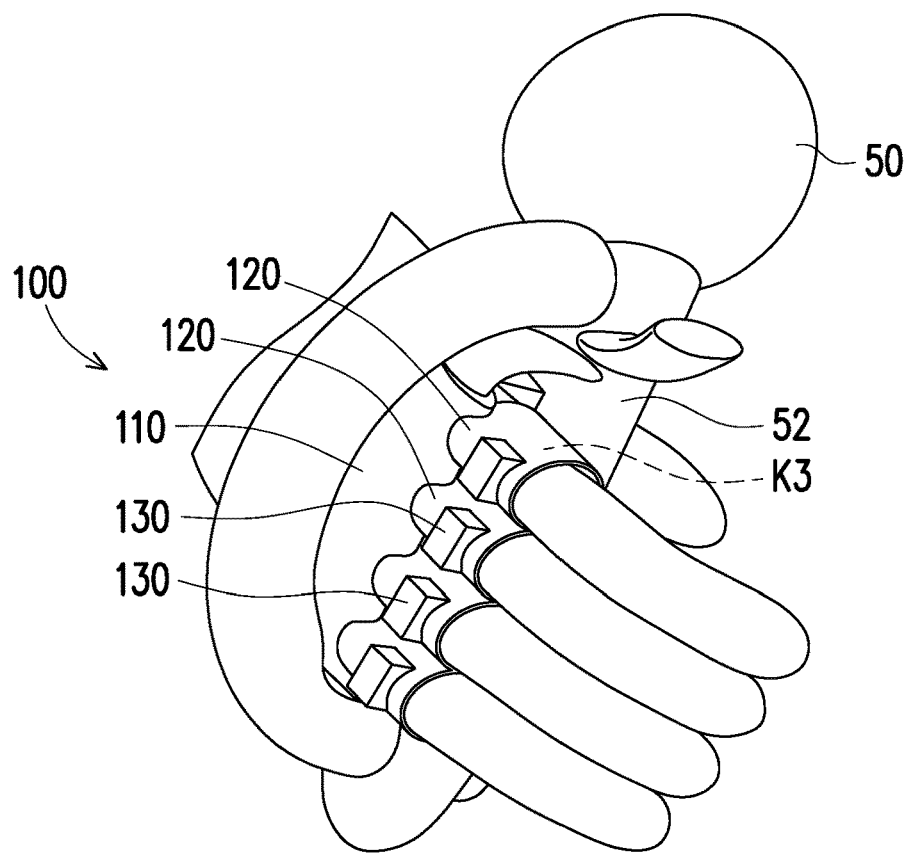
FIG. 1A is a schematic view of a finger-gesture detection device worn on a hand of a user according to an embodiment of the present disclosure.
Figure 1B:
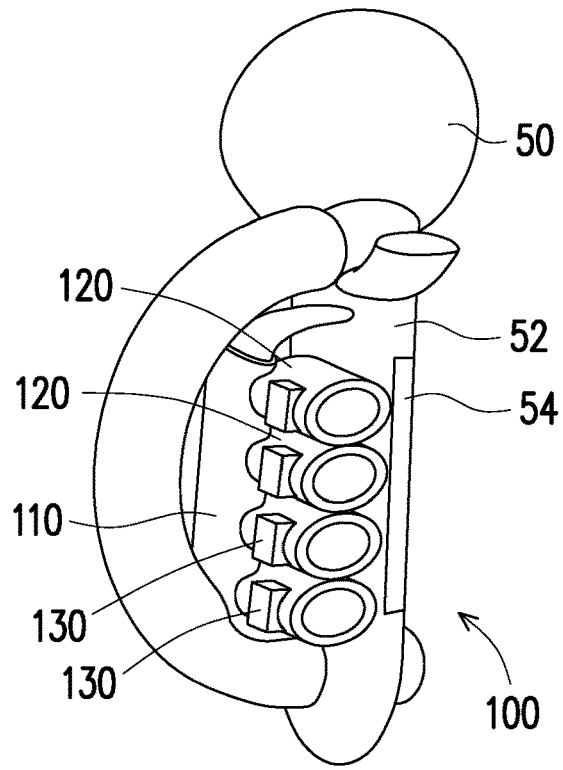
FIG. 1B is a schematic view of FIG. 1A without the hand of the user.
Figure 1C:
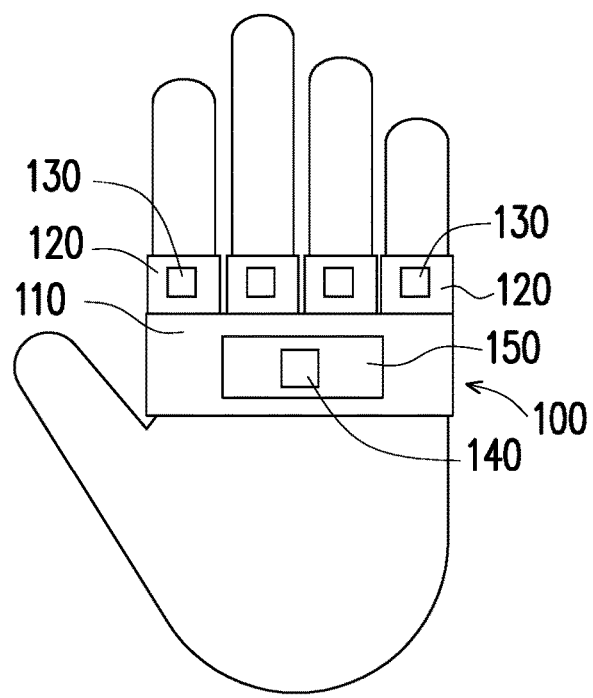
FIG. 1C is a schematic plan view of the finger-gesture detection device of FIG. 1A worn on the hand of the user.

FIG. 1A is a schematic view of a finger-gesture detection device worn on a hand of a user according to an embodiment of the present disclosure. FIG. 1B is a schematic view of FIG. 1A without the hand of the user. FIG. 1C is a schematic plan view of the finger-gesture detection device of FIG. 1A worn on the hand of the user. Referring to FIG. 1A, FIG. 1B, and FIG. 1C, the finger-gesture detection device of the present embodiment is suitable for a VR system. The VR system includes a control handle 50 and a computer. The control handle 50 is adapted to be worn on a hand of a user and may be connected to the computer in a wired or wireless manner to transfer signals with the computer. In addition, the VR system further includes a head-mounted display, which is adapted to be worn on a head of the user and may also be connected to the computer in a wired or wireless manner to transfer signals with the computer.

In the present embodiment, the control handle 50 includes a grip portion 52, adapted to be gripped by the hand of the user and moved in a three-dimensional space. The finger-gesture detection device 100 of the present embodiment includes a first wearing portion 110, a plurality of second wearing portions 120, and a plurality of first sensors 130. The first wearing portion 110 is adapted to detachably connect and surround the grip portion 52 of the control handle 50. When the grip portion 52 connects the first wearing portion 110, the grip portion 52 is positioned on one side of the first wearing portion 110. The second wearing portions 120 are each independently connected to the first wearing portion 110. When a force is applied to one of the second wearing portions 120, the corresponding second wearing portion 120 moves toward the grip portion 52. The first sensors 130 are respectively disposed on the second wearing portions 120 for detecting the position or movement of the second wearing portions 120 relative to the grip portion 52. When a user wears the finger-gesture detection device 100 of the present embodiment, the first wearing portion 110 is positioned on a palm of the user, and the second wearing portions 120 are respectively worn on a plurality of fingers of the user.

Figure 2:
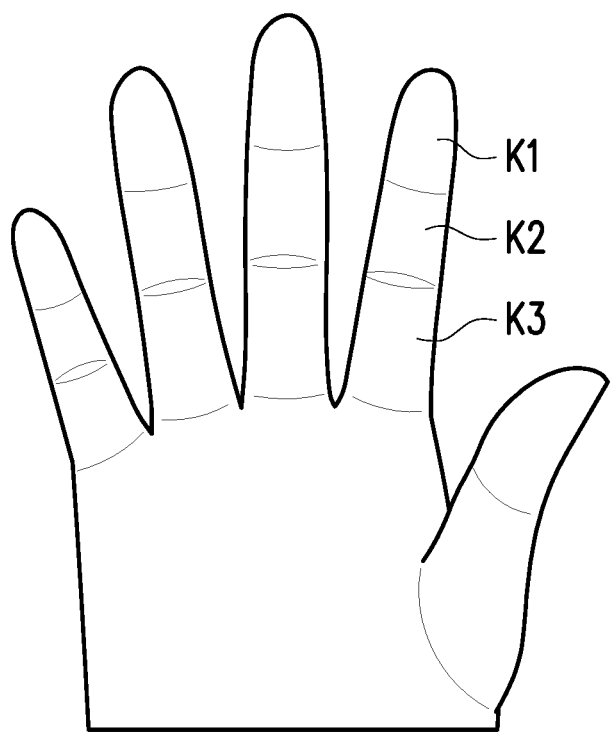
FIG. 2 is a schematic view of a knuckle of a finger.

FIG. 2 is a schematic view of a knuckle of a finger. Referring to FIG. 1A and FIG. 2, in the present embodiment, each of the fingers includes a first knuckle K1, a second knuckle K2, and a third knuckle K3, sequentially away from a fingertip. In the present embodiment, the second wearing portions 120 are respectively worn on a plurality of fingers, and correspond to the third knuckles K3 of the respective fingers.

To more clearly illustrate the finger-gesture detection device 100 of the present embodiment, the hand of the user is omitted in FIG. 1B. Referring to FIG. 1A and FIG. 1B, in the present embodiment, the first sensors 130 include an IMU and a component sensing unit (e.g., an electronic compass). In other embodiments, the first sensors may also include a bending sensor, a stretching sensor, or a magnetic component, which is not limited in the present disclosure.

In the present embodiment, the first sensor 130 is disposed on a side of the second wearing portion 120 away from the grip portion 52. That is, when the user wears the finger-gesture detection device 100, the positions of the first sensors 130 correspond to the outer sides of the third knuckles K3 of the individual fingers, respectively. In the process of the user wearing the finger-gesture detection device 100, the first sensor 130 may detect a bending degree (gesture) of the third knuckle K3 of each finger, may derive a gesture of each finger by the estimation of a finger joint motion (i.e., estimate the bending degree of the first knuckle K1 and the second knuckle K2). It is to be noted that the main implementation principle of the finger joint motion is that when the finger is bent from an open state to a palm direction, joints between the knuckles are respectively rotated inward, and the joints may be rotated in the same direction. The relationship between a rotation angle of the individual knuckles and a total rotation angle may be obtained by a statistical pattern. From the statistical result, the amounts of rotation of the first knuckle K1 and the second knuckle K2 may be calculated by evaluating the amount of rotation of the joint of the third knuckle K3. Of course, in other embodiments, the first sensor 130 may also be disposed on the first knuckle K1 or the second knuckle K2, and the gesture of each finger may also be derived by the estimation of a finger joint motion.

In the present embodiment, as shown in FIG. 1C, the finger-gesture detection device 100 further includes a control module 150 and a second sensor 140. The control module 150 is disposed on the first wearing portion 110. The second sensor 140 includes an IMU and a component sensing unit (e.g., an electronic compass), and the second sensor 140 is disposed on the first wearing portion 110 and electrically connected to the control module 150. The position of each of the first sensors 130 relative to the grip portion 52 is calculated by matching signals sensed by the first sensors 130 with signals sensed by the second sensor 140.

As shown in FIG. 1B, in the present embodiment, the control handle 50 further includes a first sensing component 54. The first sensing component 54 is, for example, a capacitive sensor or a pressure sensor, and is disposed on the grip portion 52. In other embodiments, the first sensing component may also be a Hall sensor, a magnetic component, a proximity sensor or a micro ultrasonic sensor, which is not limited in the present disclosure. In the present embodiment, the first sensor 130 and the first sensing component 54 sense each other to generate a signal. When the first sensor 130 includes an IMU, since the IMU of the first sensor 130 itself generates an error during the operation due to time accumulation, data of the IMU (i.e., a detection result) is gradually distorted. In the present embodiment, by means of the first sensing component 54 disposed on the control handle 50, when any of the fingers of the user touches the position corresponding to the control handle 50 (i.e., the first sensing component 54), the IMU of the first sensor 130 on the finger is automatically corrected, so that the IMU of the first sensor 130 can be quickly repositioned and calibrated to avoid the distortion caused by the IMU of the first sensor 130 due to accumulative error in too much operation time. Besides, the first sensing component 54 may provide a richer operating experience for the user in addition to being used to correct the IMU in real time. For example, when the corresponding first sensing component 54 (e.g., a pressure sensor) is pressed, the first sensing component may be used as a mechanism for triggering another event.

Figure 1D:
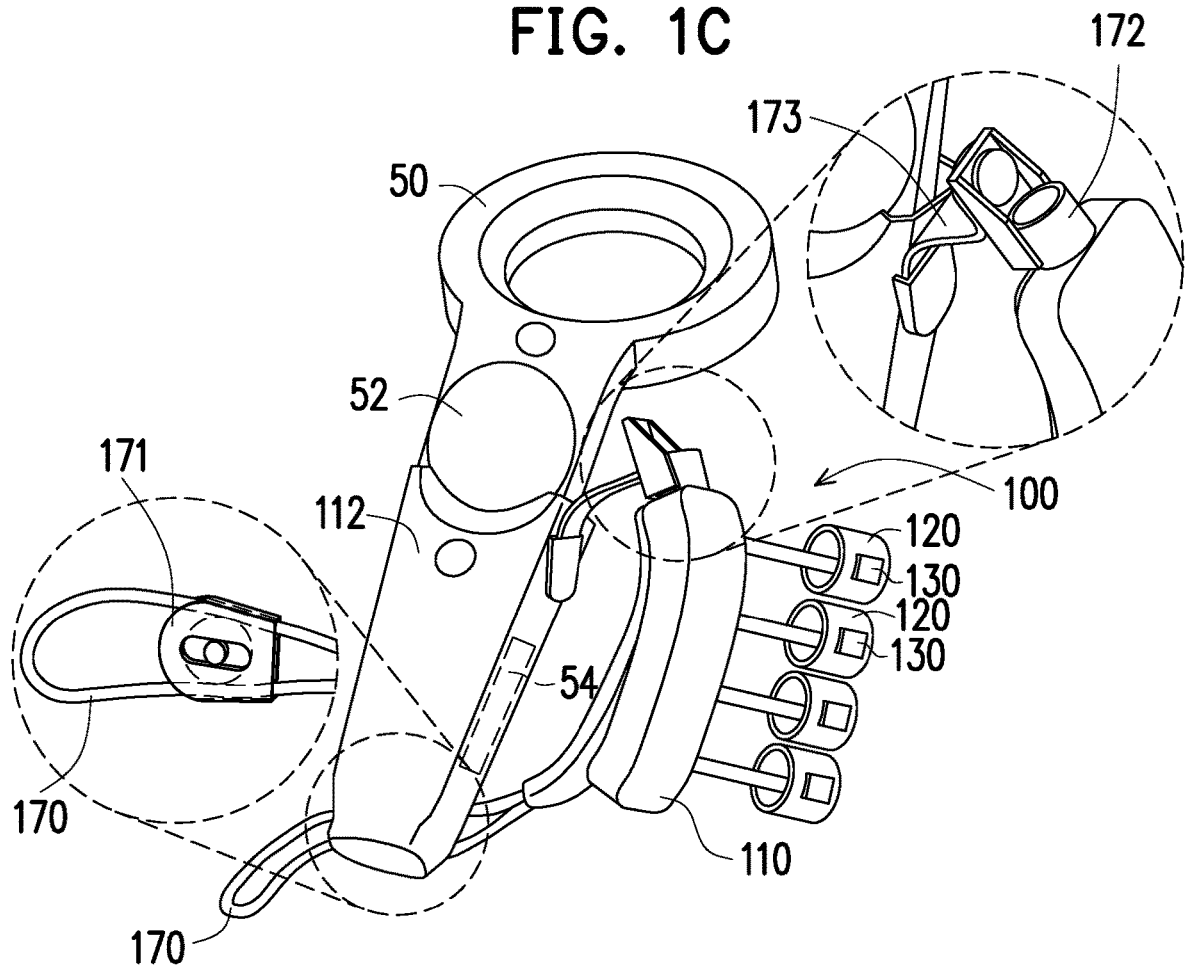
FIG. 1D is a schematic assembly view of the finger-gesture detection device of FIG. 1A and a control handle.

FIG. 1D is a schematic assembly view of the finger-gesture detection device of FIG. 1A and a control handle. Referring to FIG. 1A and FIG. 1D, the control handle 50 is in another form. The finger-gesture detection device 100 includes a sleeve 112 conforming to the shape of the grip portion 52 of the control handle 50, which may be sleeved with the grip portion 52. Both ends of the first wearing portion 110 are flexibly connected to the sleeve 112 respectively, so that the first wearing portion 110 may be detachably connected to the control handle 50 by sleeving between the sleeve 112 and the grip portion 52. In this case, the first sensing component 54 (e.g., a magnet, a Hall sensor, a capacitive sensor, or a pressure sensor, etc.) may be disposed on the inner side of the sleeve 112. One end of the first wearing portion 110 is connected to the sleeve 112 in a length adjustable manner, so that the palm of the user can be bound between the first wearing portion of the finger-gesture detection device 100 and the grip portion 52 of the control handle 50, thereby achieving the state in which the control handle 50 is not released from the palm when the user releases the hand. Applying the finger-gesture detection device 100 of the present embodiment to the control handle 50 can expand a finger detection function of the control handle 50.

In the present embodiment, as shown in FIG. 1D, a lower end of the first wearing portion 110 passes through an elastic cord 170 and a retractable mechanism 171 through which the elastic cord 170 penetrates, so that the user can adjust the tightness according to the size of the palm. The retractable mechanism 171 may include a disk and a component having a trapezoidal channel for housing the disk. Besides, an upper end of the first wearing portion 110 may be connected to the sleeve 112 through a dual-rotation-shaft mechanism 172 and a flexible component 173 sequentially. The dual-rotation-shaft mechanism 172 provides an additional rotation mechanism (e.g., dual rotation degrees of freedom) that can accommodate different palm angles formed by different gripping situations of the user, so that the first wearing portion 110 can be attached more tightly to the backside position of the palm. Besides, the aforementioned component configuration also greatly improves wearing comfort and stability, and does not cause a large positional shift due to excessive user motion.

In the present embodiment, the first wearing portion 110 may be made of an elastic material. When the user wears corresponding four fingers (four fingers other than the thumb) into the second wearing portion 120, the control handle 50 can be attached to the hand through the elastic first wearing portion 110, thereby providing the effect of being not prone to falling. In the process of using the finger-gesture detection device 100, the user does not need to grip the control handle 50 for a long time, and the fingers can freely perform other work. For example, when a mobile phone rings, the user does not need to put down the control handle 50, and can pick up the mobile phone to answer the call, or can pick up other objects, thereby greatly increasing the degree of freedom of the hand of the user. Besides, the second wearing portions 120 having elasticity may be respectively fixed on the third knuckles K3 of the user, so that an actuator (not shown) may be placed in each of the second wearing portions 120 to provide individual tactile feedback feelings of different fingers of the user (i.e., only a finger interacting with a virtual object will feel the corresponding tactile feedback). Furthermore, in other embodiments, other sensors, such as a PPG (heart rate sensor), may be embedded in the second wearing portion 120. Since the second wearing portions 120 are attached to the third knuckle K3 for a long time, the sensors in the second wearing portion 120 may effectively detect and record physiological information of the user.

Figure 1E:
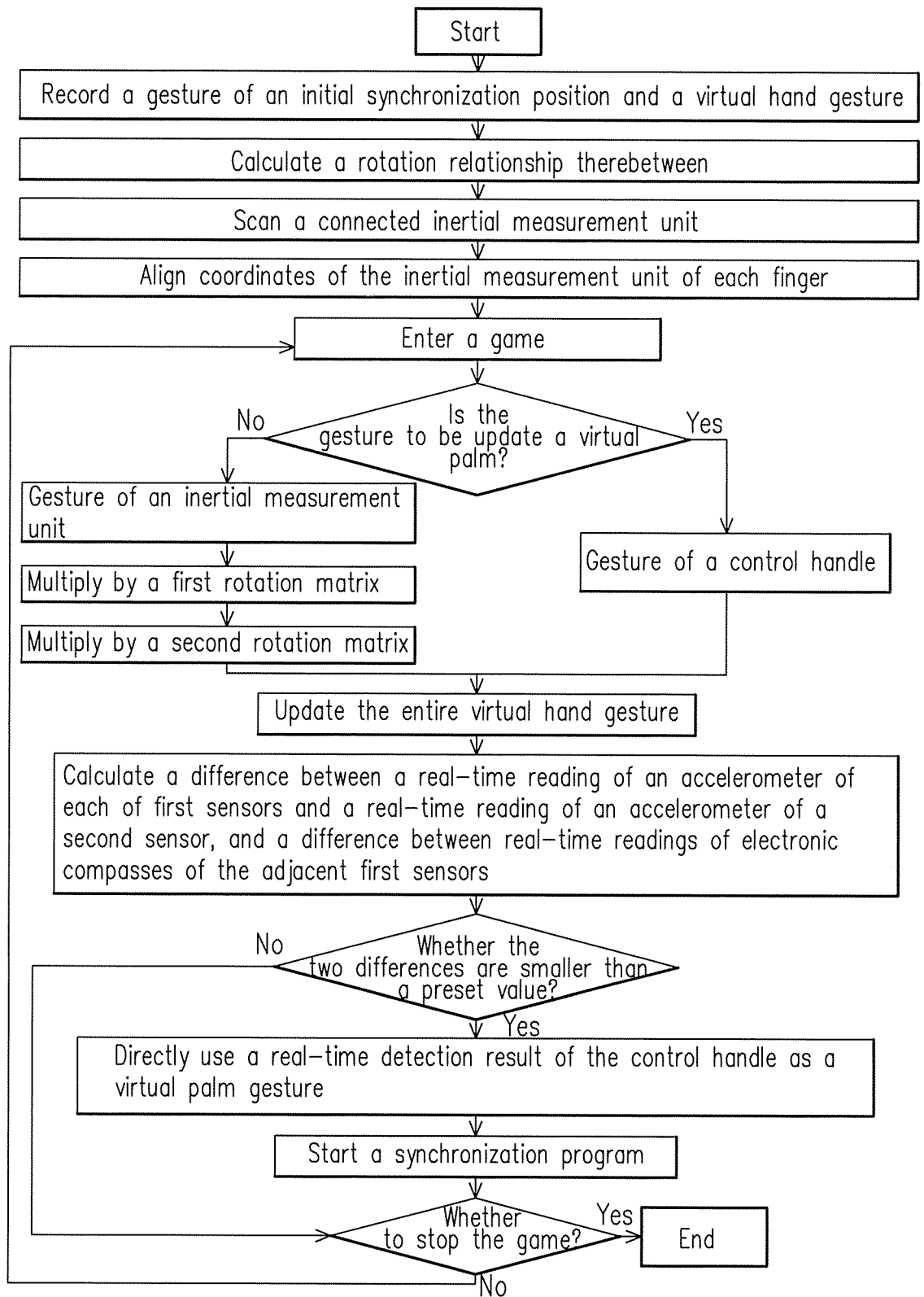
FIG. 1E is a flowchart of a correction method for a VR system including the finger-gesture detection device of FIG. 1A.

FIG. 1E is a flowchart of a correction method for a VR system including the finger-gesture detection device of FIG. 1A. The VR system is used to map a real hand gesture of the user (i.e., a real-time hand gesture of the user) to a virtual hand gesture (i.e., a real-time hand gesture of a virtual character). The virtual hand gesture includes a plurality of virtual finger gestures and a virtual palm gesture. The virtual palm gesture is based on the gesture of the control handle 50. The virtual finger gesture is based on the gesture of the first sensor 130 (IMU) on the individual finger. Referring to FIG. 1A, FIG. 1B, and FIG. 1E, the correction method shown in FIG. 1E includes the following steps. First, the computer records a gesture of an initial synchronization position and a virtual hand gesture (the gestures are mapped according to quaternion), and calculates a rotation relationship therebetween (i.e., a transformation matrix). Since there is a rotation relationship between the gesture of the control handle 50 and the gesture of the first sensor 130, the rotation relationship must be calculated in advance to correct the virtual hand gesture. Thereafter, the first sensor 130 mounted on each finger is scanned, and coordinate alignment of the first sensors 130 is performed. The purpose of aligning the first sensors 130 is to obtain the same reference points when the first sensors 130 are rotated, so as to unify a relative gesture relationship of the respective first sensors 130. After entering a game, the computer will determine an update of the virtual palm gesture (corresponding to the quaternion of the control handle) or an update of the virtual finger gesture (corresponding to the quaternion of the IMU), and correspondingly calculate a first rotation matrix and a second rotation matrix. In detail, the first rotation matrix is a transformation matrix between a coordinate system of the individual first sensor 130 and a coordinate system of the second sensor 140. The second rotation matrix is a transformation matrix between the coordinate system of the second sensor 140 and a coordinate system of the control handle 50. When a gesture to be updated is a non-virtual palm, i.e., the IMU is used to update the virtual finger gesture, the computer multiplies a real-time detection result (i.e., a gesture matrix) of each of the first sensors 130 by the first rotation matrix and the second rotation matrix to calculate each of the virtual finger gestures. Or, when a gesture to be updated is a virtual palm, the gesture of the control handle is directly used as the gesture of the virtual palm. Next, the computer updates the entire virtual hand gesture according to a new virtual finger gesture and virtual palm gesture (i.e., a real hand gesture of the user).

After updating the virtual hand gesture, as shown in FIG. 1E, according to the correction method, a difference between a real-time reading of an accelerometer of each of the first sensors 130 and an accelerometer value of the second accessory sensor 140 and a difference between real-time readings of the electronic compasses of the two adjacent first sensors 130 may be calculated by the computer. When the difference between the real-time reading of the accelerometer of each of the first sensors 130 and the real-time reading of the accelerometer of the second accessory sensor 140 is smaller than a preset value and the difference between the real-time readings of the electronic compasses of the adjacent first sensors 130 is smaller than another preset value, the computer corrects the virtual finger gesture of the virtual hand gesture to make the fingers straightened and closed with respect to the palm (as shown in FIG. 1C).

With the aforementioned correction method, it is possible to avoid the distortion of a virtual finger caused by the IMU due to accumulative errors and excessive operation time. Besides, through the correction method shown in FIG. 1E, as long as the user straightens the four fingers at any angle, the computer updates the virtual finger gesture according to the real finger gesture to achieve an immediate correction effect.

Figure 3:
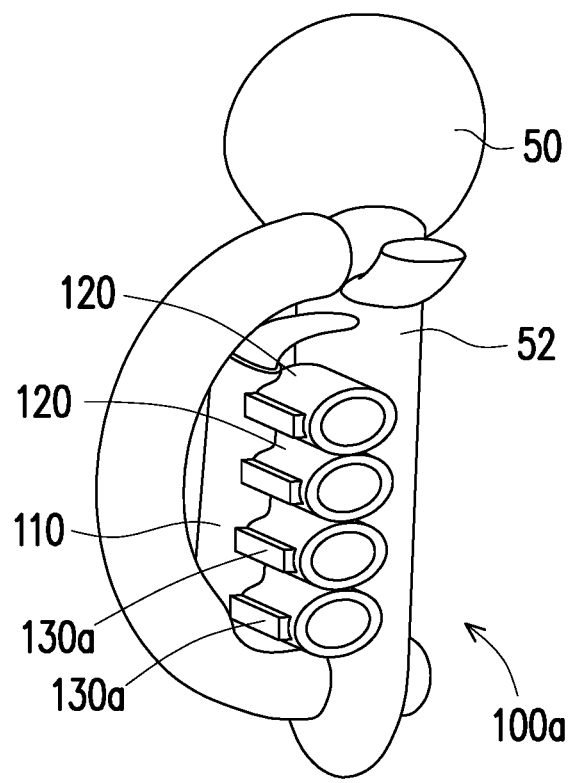
FIG. 3 is a schematic view of a finger-gesture detection device suitable for a control handle according to another embodiment of the present disclosure.

FIG. 3 is a schematic view of a finger-gesture detection device suitable for a control handle according to another embodiment of the present disclosure. A finger-gesture detection device 100a shown in FIG. 3 is similar to the finger-gesture detection device 100 shown in FIG. 1A and FIG. 1B, except that a first sensor 130a of the finger-gesture detection device 100a is, for example, a bending sensor or a stretching sensor. In the present embodiment, the first sensor 130a capable of detecting bending or stretching is utilized to sense a bending degree of the third knuckle K3 of each finger. With the characteristics of the first sensor 130a, the bending degree of the third knuckle K3 may be obtained, and then the gesture of each finger may be derived by estimating a finger joint motion.

Figure 4:
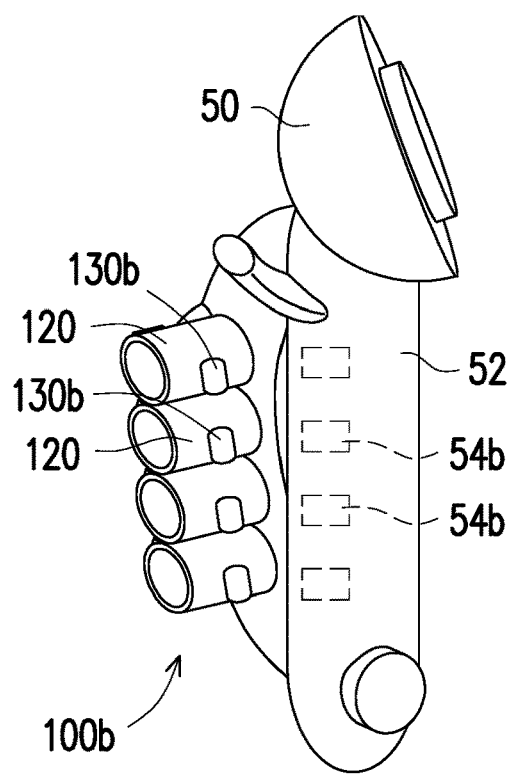
FIG. 4 is a schematic view of a finger-gesture detection device suitable for a control handle according to another embodiment of the present disclosure.

FIG. 4 is a schematic view of a finger-gesture detection device suitable for a control handle according to another embodiment of the present disclosure. A finger-gesture detection device 100b shown in FIG. 4 is similar to the finger-gesture detection device 100 shown in FIG. 1A and FIG. 1B, except that the grip portion 52 of the present embodiment is provided with a plurality of sensors 54b, and the finger-gesture detection device 100b includes a plurality of sensing components 130b. The sensing components 130b are respectively disposed on the second wearing portions 120, and respectively correspond to the sensing components 130b for detecting the position or movement of the second wearing portions 120 relative to the grip portion 52. When the finger-gesture detection device 100b is worn on the hand of the user, the position of the sensing component 130b corresponds to the inner side of the third knuckle K3 of each finger. In the present embodiment, the sensor 54b is, for example, a Hall sensor and is embedded in the grip portion 52. The sensors 54b and the sensing components 130b sense each other to generate a signal. With the characteristics of the Hall sensor capable of sensing the magnetic strength, a transformation relationship between the bending degree of each finger and the magnetic sensing strength can be obtained. With the obtained bending degree of the third knuckle K3, the gesture of each finger is derived by estimating a finger joint motion.

Further, the plurality of sensing components 130b in the second wearing portion 120 is alternately arranged. The sensing components 130b include magnets, and the sensing components 130b alternately face the grip portion 52 with S magnetic poles or N magnetic poles, respectively, so that the magnets of the adjacent sensing components 130b are alternate in polarity. Since magnetic lines of the sensing components 130b on the adjacent fingers are opposite in direction, signals sensed by the corresponding sensors 54b (Hall sensor) are different in forward and reverse directions, and a sensing error caused by misalignment of the finger position can be avoided. In this way, when the finger misalignment causes the non-corresponding Hall sensor to generate a signal output, the system may quickly determine a signal generated by the approach of an incorrect finger, thereby achieving the function of error elimination.

Figure 5A:
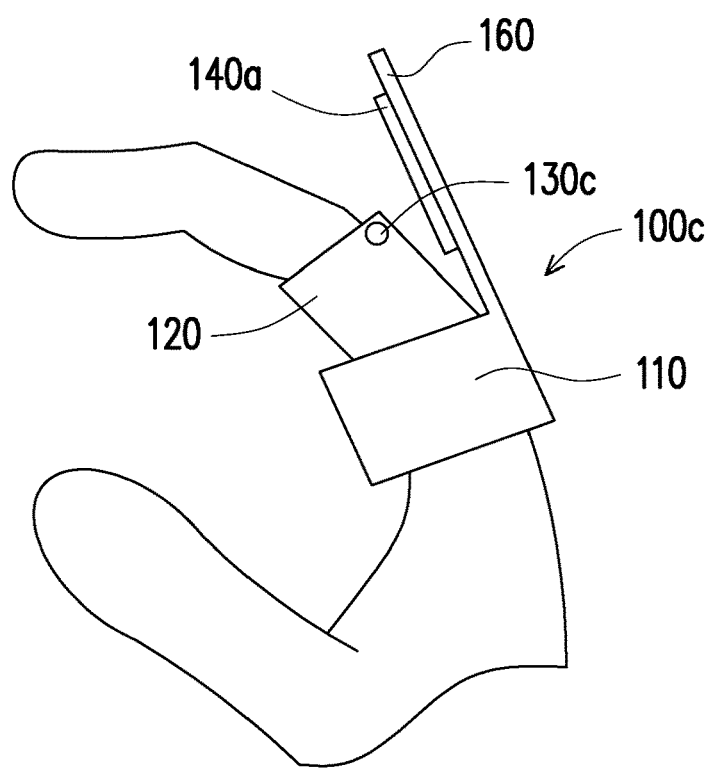
FIG. 5A is a schematic view of a finger-gesture detection device worn on a hand of a user according to another embodiment of the present disclosure.

FIG. 5A is a schematic view of a finger-gesture detection device worn on a hand of a user according to another embodiment of the present disclosure. A finger-gesture detection device 100c shown in FIG. 5A is similar to the finger-gesture detection device 100 shown in FIG. 1A and FIG. 1B, except that the finger-gesture detection device 100c of the present embodiment further includes a sheet-like extending portion 160 and a second sensing component 140a. The second sensing component 140a extends toward first sensors 130c and is disposed on the first wearing portion 110 to sense with the first sensors 130c to generate a signal. The second wearing portions 120 are disposed between the second sensing component 140a and the grip portion (not shown in FIG. 5A).

In the present embodiment, when the user wears the finger-gesture detection device 100c, the position of the sheet-like extending portion 160 is close to the back of the hand of the user, and is suitable as a sensing reference position of the first sensor 130c. The first sensor 130c is, for example, a Hall sensor. The second sensing component 140a is, for example, a magnetic component and is disposed on the sheet-like extending portion 160. When the first sensor 130c detects the second sensing component 140a, a signal detected by the first sensor 130c is corrected. That is, when the finger is bent or straightened, the first sensor 130c obtains different values according to a distance between the third knuckle K3 and the sheet-like extending portion 160. Also, with the bending degree of the third knuckle K3 of each finger, the bending degrees of the first knuckle K1 and the second knuckle K2 are estimated, and finally the gesture of each finger is obtained. In other embodiments, the first sensor may also be a proximity sensor or a micro ultrasonic sensor. A distance between the first sensor and the second accessory sensor is detected by light reflection or ultrasonic wave to obtain a distance relationship between each finger and a reference position, thereby detecting the bending gesture of each finger.

In other embodiments, the first sensor may include an IMU and a component sensing unit. When the component sensing unit detects the second sensing component, signals corresponding to corresponding positions of the second wearing portions and the grip portion, detected by the IMU, are corrected.

Figure 5B:
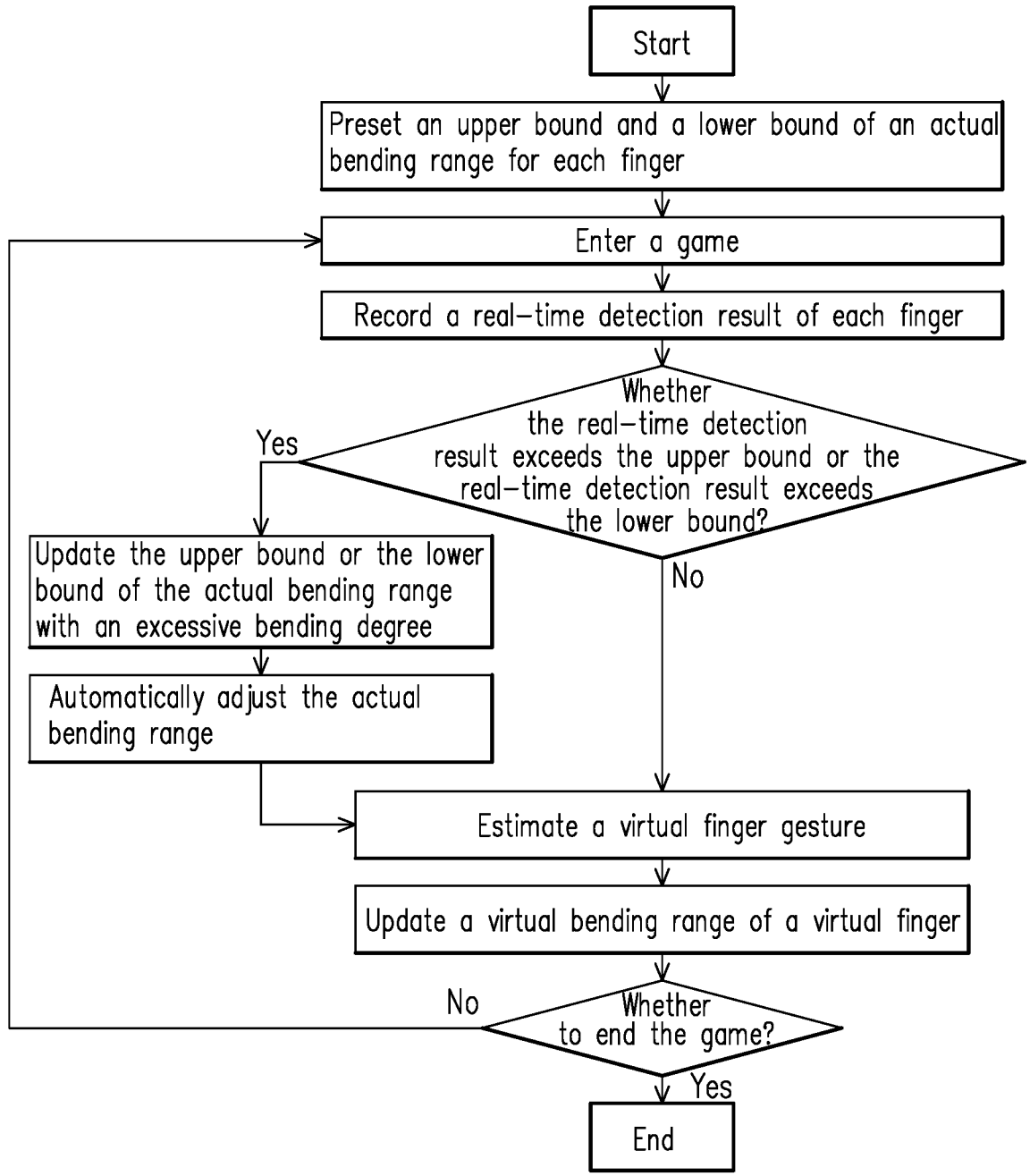
FIG. 5B is a flowchart of a correction method for a VR system including the finger-gesture detection device of FIG. 5A.

FIG. 5B is a flowchart of a correction method for a VR system including the finger-gesture detection device of FIG. 5A. Referring to FIG. 5A and FIG. 5B, the calibration method includes the following steps. First, an actual bending range (e.g., an angle range) of a finger of a user relative to a palm is calculated by the computer of the VR system according to an initial detection result (e.g., a magnetic value, a resistance value, a capacitance value, or other data) of the first sensor 130c, where the actual bending range has an upper bound (e.g., a maximum angle value) and a lower bound (e.g., a minimum angle value). Here, the upper bound is a maximum value (or a minimum value) sensed when the first sensor 130c is closest to the sheet-like extending portion 160, and the lower bound is a minimum value (or a maximum value) sensed when the first sensor 130c is farthest away from the sheet-like extending portion 160. Next, the computer maps a virtual bending range of a virtual finger according to the actual bending range. After entering a game, according to an interaction between the user and a virtual object, the computer will continuously record a real-time detection result (e.g., a magnetic value, a resistance value, a capacitance value, or other data) detected by each finger. When a bending degree of the finger calculated according to the real-time detection result exceeds the upper bound of the actual bending range, the upper bound of the actual bending range is updated with an excessive bending degree. When a bending degree of the finger calculated according to the real-time detection result exceeds the lower bound of the actual bending range, the lower bound of the actual bending range is updated with an excessive bending degree. Next, the computer will use the upper and lower bounds of the updated actual bending range as an estimation range of a finger bending gesture, thereby simultaneously correcting a virtual finger gesture.

With the correction method shown in FIG. 5B, different detection ranges may be established for different people, different hand types, and different grip modes, thereby more accurately estimating and correcting the virtual finger gesture in VR.

Figure 6:
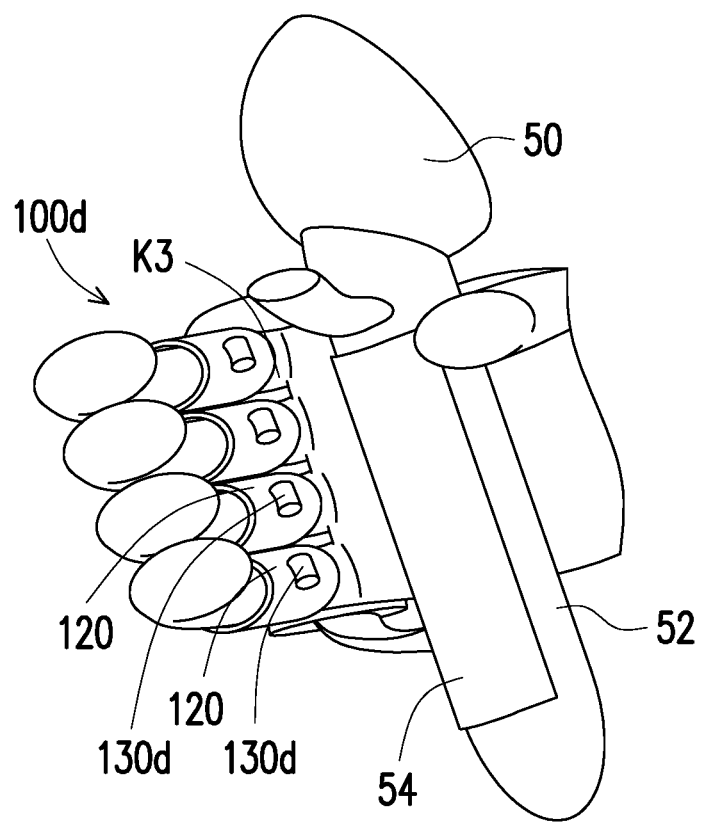
FIG. 6 is a schematic view of a finger-gesture detection device suitable for a control handle according to another embodiment of the present disclosure.

FIG. 6 is a schematic view of a finger-gesture detection device suitable for a control handle according to another embodiment of the present disclosure. A finger-gesture detection device 100d shown in FIG. 6 is similar to the finger-gesture detection device 100c shown in FIG. 5A, except that the finger-gesture detection device 100d of the present embodiment omits the sheet-like extending portion 160. The first sensor 130d is, for example, a Hall sensor disposed on a side of the second wearing portion 120 close to the grip portion 52. That is, when the user wears the finger-gesture detection device 100d of the present embodiment, the first sensor 130d corresponds to the inner side of each finger.

In the present embodiment, the sensing component 54 is used as a sensing reference position of the first sensor 130d. When the finger is bent or straightened, the first sensor 130d obtains a corresponding sensing value according to a distance from the sensing component 54 including a magnetic component. Also, according to a bending motion relationship of each finger joint, the bending degree of the first knuckle K1 and the second knuckle K2 is estimated from the bending degree of the third knuckle K3, and finally the gesture of each finger is obtained.

Based on the foregoing, when the finger-gesture detection device of the present disclosure is worn on a hand of a user, the position of the first sensor corresponds to a third knuckle of a finger of the user. Therefore, the first sensor may detect the gesture of the third knuckle of each finger, and derive the gesture of each finger by estimating a finger joint motion. By integrating the finger-gesture detection device of the present disclosure and the control handle, the bending degree and gesture of each finger can be detected. As a result, the user can perform more complicated input functions in VR, which in turn brings out diversified VR interactions and allows the user to play games in a more natural way.

The correction method of the present disclosure can improve an accumulative error generated by the IMU due to long-term use. The user only needs to straighten four fingers at the same time for a short period of time, and the computer can update a virtual finger gesture with a real finger gesture, thereby achieving the effect of immediate correction.

Besides, the correction method of the present disclosure continuously updates, by the computer, upper and lower bounds of an actual bending range of a finger relative to a palm according to a real-time detection result, so as to correct the virtual finger gesture. The correction method can establish different detection ranges for different hand types or different grip modes of different users, thereby more accurately mapping a finger gesture in VR.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A finger-gesture detection device, adapted for a control handle, the control handle including a grip portion, adapted to be gripped by a hand and moved in a three-dimensional space, and the finger-gesture detection device comprising:
    a first wearing portion, adapted to detachably surround the grip portion of the control handle, when the grip portion is connected to the first wearing portion, the grip portion being positioned on a side of the first wearing portion;
    a plurality of second wearing portions, each being independently connected to the first wearing portion, when a force is applied to one of the second wearing portions, the corresponding second wearing portion moving toward the grip portion; and
    a plurality of first sensors, respectively disposed on the plurality of second wearing portions for detecting positions or movements of the second wearing portions relative to the grip portion.

2. The finger-gesture detection device according to claim 1, wherein the plurality of second wearing portions are respectively worn on a plurality of fingers of the hand, each of the fingers comprises a first knuckle, a second knuckle, and a third knuckle sequentially away from a fingertip, and the second wearing portions are respectively worn on the third knuckles.

3. The finger-gesture detection device according to claim 1, wherein the control handle comprises a plurality of first sensing components, the first sensing components are disposed on the grip portion, and the first sensing components and the first sensors sense each other to generate a signal.

4. The finger-gesture detection device according to claim 3, wherein the first sensing components comprise magnets, and the first sensing components alternately face the first sensors with S magnetic poles or N magnetic poles, respectively.

5. The finger-gesture detection device according to claim 4, further comprising:
    a second sensing component, extending toward the first sensor and disposed on the first wearing portion to sense with the first sensors to generate a signal, the second wearing portions being disposed between the second sensing component and the grip portion.

6. The finger-gesture detection device according to claim 5, wherein when the first sensor detects the second sensing component, a signal detected by the first sensor is corrected.

7. The finger-gesture detection device according to claim 5, wherein the first sensor comprises an inertial measurement unit and a component sensing unit, and when the component sensing unit detects the second sensing component, signals corresponding to corresponding positions of the second wearing portions and the grip portion, detected by the inertial measurement unit, are corrected.

8. The finger-gesture detection device according to claim 1, further comprising:
    a control module, disposed on the first wearing portion; and
    a second sensor, disposed on the first wearing portion and electrically connected to the control module, a position of each of the first sensors relative to the grip portion being calculated by matching signals sensed by the first sensors with a signal sensed by the second sensor.

9. A finger-gesture detection device, adapted for a control handle, the control handle including a grip portion, adapted to be gripped by a hand and moved in a three-dimensional space, the grip portion being provided with a plurality of sensors, and the finger-gesture detection device comprising:
    a first wearing portion, adapted to detachably surround the grip portion of the control handle, when the grip portion is connected to the first wearing portion, the grip portion being positioned on a side of the first wearing portion;
    a plurality of second wearing portions, each being independently connected to the first wearing portion, when a force is applied to one of the second wearing portions, the corresponding second wearing portion moving toward the grip portion; and
    a plurality of sensing components, respectively disposed on the second wearing portions, a plurality of sensors corresponding to the sensing components detecting positions or movements of the second wearing portions relative to the grip portion.

10. The finger-gesture detection device according to claim 9, wherein the second wearing portions are respectively worn on a plurality of fingers of the hand, each of the fingers comprises a first knuckle, a second knuckle, and a third knuckle sequentially away from a fingertip, and the second wearing portions are respectively worn on the third knuckles.

11. The finger-gesture detection device according to claim 9, wherein the sensing components comprise magnets, and the sensing components alternately face the grip portion with S magnetic poles or N magnetic poles, respectively.

12. A control assembly, applied to virtual reality, the control assembly comprising:
    a control handle, including a grip portion, adapted to be gripped by a hand and moved in a three-dimensional space; and
    a finger-gesture detection device, including:
        a first wearing portion, adapted to detachably surround the grip portion of the control handle, when the grip portion is connected to the first wearing portion, the grip portion being positioned on a side of the first wearing portion;

a plurality of second wearing portions, each being independently connected to the first wearing portion, when a force is applied to one of the second wearing portions, the corresponding second wearing portion moving toward the grip portion; and a plurality of first sensors, respectively disposed on the plurality of second wearing portions for detecting positions or movements of the second wearing portions relative to the grip portion.

13. The control assembly according to claim 12, wherein the control handle comprises a sensing component, the sensing component being disposed on the grip portion.

14. A correction method, adapted for a virtual reality system, the virtual reality system mapping a real hand gesture of a user to a virtual hand gesture, the virtual hand gesture including a plurality of virtual finger gestures and a virtual palm gesture, the virtual reality system including a control handle for being gripped by a hand of the user, a finger-gesture detection device detachably surrounding the control handle and worn on the hand, and a computer, the finger-gesture detection device including a plurality of first sensors and a second sensor, the first sensors being respectively located on a plurality of fingers of the hand, the second sensor being located on a palm of the hand, each of the first sensors including an inertial measurement unit (IMU) and a component sensing unit, the second sensor comprising an inertial measurement unit and a component sensing unit, and the correction method co p sing:

multiplying, by the computer, a real-time detection result of each of the first sensors by a first rotation matrix and a second rotation matrix to calculate each of the virtual finger gestures, the first rotation matrix being a transformation matrix between a coordinate system of each of the first sensors and a coordinate system of the second sensor, and the second rotation matrix being a transformation matrix between the coordinate system of the second sensor and a coordinate system of the control handle; and directly using, a real-time detection result of the control handle as the virtual palm gesture by the computer.

15. The correction method according to claim 14, further comprising:

when a difference between a real-time reading of an accelerometer of each of the first sensors and a real-time reading of an accelerometer of the second sensor is smaller than a preset value and a difference between real-time readings of the component sensing units of the adjacent first sensors is smaller than another preset value, correcting the virtual finger gesture of the virtual hand gesture to straighten and close up the fingers with respect to the palm by the computer.

16. A correction method, adapted for a virtual reality system, the virtual reality system including a control handle for being gripped by a hand of a user, a finger-gesture detection device detachably connecting the control handle and worn on the hand, and a computer, and the correction method comprising:

calculating, by the computer, an actual bending range of a finger of the hand of the user relative to a palm of the hand according to an initial detection result of the finger-gesture detection device, the actual bending range containing an upper bound and a lower bound;

updating the upper bound of the actual bending range with an excessive bending degree, when a bending degree of the finger calculated according to a real-time detection result of the finger-gesture detection device exceeds the upper bound of the actual bending range; and updating the lower bound of the actual bending range with an excessive bending degree, when a bending degree of the finger calculated according to a real-time detection result of the finger-gesture detection device exceeds the lower bound of the actual bending range.

* * * * *